United States Patent [19]

Chen

[11] Patent Number: 5,315,981

[45] Date of Patent: May 31, 1994

[54] METHOD FOR CONVERTING A DIESEL ENGINE TO A NATURAL GAS FUELED ENGINE

[75] Inventor: Tze-Ning Chen, Sudbury, Mass.

[73] Assignee: Tecogen Inc., Waltham, Mass.

[21] Appl. No.: 931,676

[22] Filed: Aug. 18, 1992

[51] Int. Cl.⁵ .................................... F02M 21/02
[52] U.S. Cl. ........................ 123/526; 123/27 GE
[58] Field of Search .............. 123/316, 90.16, 526, 123/525, 527, 528, 27 GE

[56] References Cited

U.S. PATENT DOCUMENTS

| | | | |
|---|---|---|---|
| Re. 26,145 | 1/1967 | Friddell | 123/32 |
| 1,305,172 | 5/1919 | Sawtelle . | |
| 2,817,322 | 12/1957 | Miller | 123/75 |
| 3,015,934 | 1/1962 | Miller | 123/316 |
| 3,986,351 | 10/1976 | Woods et al. | 60/274 |
| 4,280,451 | 7/1981 | Moore | 123/90.6 |
| 4,505,249 | 3/1985 | Young | 123/27 GE |
| 4,852,353 | 8/1989 | Holmér | 123/316 |
| 4,865,001 | 9/1989 | Jensen | 123/27 GE |
| 4,867,127 | 9/1989 | Quirchmayr et al. | 123/527 |
| 4,911,124 | 3/1990 | Bennett | 123/321 |
| 4,916,903 | 4/1990 | Holmér | 123/316 |
| 4,958,606 | 9/1990 | Hitomi | 123/316 |
| 5,000,138 | 3/1991 | Bennett | 123/169 PA |

Primary Examiner—Noah P. Kamen
Assistant Examiner—Erick Solis
Attorney, Agent, or Firm—Lurusso & Loud

[57] ABSTRACT

A method for converting a diesel engine to a natural gas fueled engine, the method comprising the steps of providing new cam profiles on a cam shaft portion of the diesel engine, the new cam profiles being operative to close intake valves of cylinder heads of the engine during intake strokes, operative to close exhaust valves of the cylinder heads, and operative no earlier than the exhaust valves closures to open associated intake valves, modifying portions of the cylinder heads to adapt the cylinder heads to accept spark plugs, fixing spark plugs in the cylinder heads, providing means for conveying natural gas fuel to the intake valves, providing a blower for supplying air under pressure to the intake valves, and providing an after-cooler for cooling the air supplied by the blower prior to the air reaching the intake valves.

10 Claims, 3 Drawing Sheets

METHOD FOR CONVERTING A DIESEL ENGINE TO A NATURAL GAS FUELED ENGINE

BACKGROUND OF THE INVENTION

1. Field of the Invention

This invention relates to internal combustion engines, and is directed more particularly to a method for converting a four-stroke cycle diesel engine to a spark ignition natural gas fueled engine.

2. Description of the Prior Art

The conversion of diesel engines to natural gas engines is generally known. Such conversions have involved replacing the diesel fuel injectors with spark plugs connected to a suitable ignition system, and providing a carburetor on the intake manifold. In U.S. Pat. No. Re. 26,145, reissued Jan. 24, 1967, to James F. Friddell, such conversions are discussed, along with an improvement for no-load or low-load applications.

In U.S. Pat. No. 4,911,124, issued Mar. 27, 1990, to John R. M. Bennett, there is described rocker and fulcrum mechanism by which the opening of the exhaust valves of the engine is reduced to minimize reflux of exhaust gases into the combustion chamber.

U.S. Pat. No. 5,000,138, issued Mar. 19, 1991, to John R. M. Bennett, is directed to a method for installing spark plugs in a diesel internal combustion engine for converting the engine for use with gaseous fuel.

Such prior art conversions typically require modification of the piston or cylinder head to reduce the compression ratio to a value suitable for natural gas. The effort and expense required to develop a new piston and/or cylinder head can be substantial and, once done, will not be generally applicable to a variety of engines.

Further, in turbo-charged diesel engines, wherein air is forced under pressure into an intake manifold and thence into the cylinder, the valve timing is such that scavenging occurs at the end of the exhaust stroke and the beginning of the intake stroke. If left unremedied in conversion to gas, such timing leads to loss of fuel directly to the exhaust, affecting the thermal efficiency of the engine and emissions.

It therefore would be beneficial to have available a method by which a diesel engine could be converted to run on natural gas, without the requirement of substantial modification or replacement of the cylinder heads and/or pistons, and which would provide for proper timing of exhaust valve and inlet valve operation.

SUMMARY OF THE INVENTION

It is, therefore, an object of the invention to provide a method for converting a four-stroke diesel engine to a spark ignition natural gas engine without replacement of, or substantial modification of, the cylinder head and/or pistons.

A further object of the invention is to provide a method for converting a diesel engine to a natural gas engine, with modification of timing of operation of exhaust valves and inlet valves such as to accommodate the octane of the natural gas and to permit use of a pre-mixed fuel/air metering system in a turbo charged or supercharged engine, to provide improved mixing of fuel and air, with consequent improved combustion and emissions.

A still further object is to provide such a method resulting in a natural gas engine having substantially the same power output as the diesel engine, and having variable spark timing for high performance at various speeds and torques.

A still further object is to provide such a method as is applicable to diesel engines of all sizes.

With the above and other objects in view, as will hereinafter appear, a feature of the present invention is the provision of a method for converting a four-stroke cycle diesel engine to a natural gas fueled engine, the method comprising the steps of providing new cam profiles on a camshaft portion of the diesel engine, the new cam profiles being operative to close intake valves of cylinder heads of the engine during intake strokes, operative to close exhaust valves of the cylinder heads, and operative no earlier than the exhaust valves closure to open associated intake valves, modifying portions of the cylinder heads to adapt the cylinder heads to accept spark plugs, fixing spark plugs in the cylinder heads, providing means for conveying natural gas fuel to the intake valves, providing a blower for supplying air under pressure to the intake valves, and providing an after-cooler for cooling the air supplied by the blower prior to the air reaching the intake valves.

The above and other features of the invention, including various novel details of construction and combinations of parts, will now be more particularly described with reference to the accompanying drawings and pointed out in the claims. It will be understood that the particular method embodying the invention is described by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
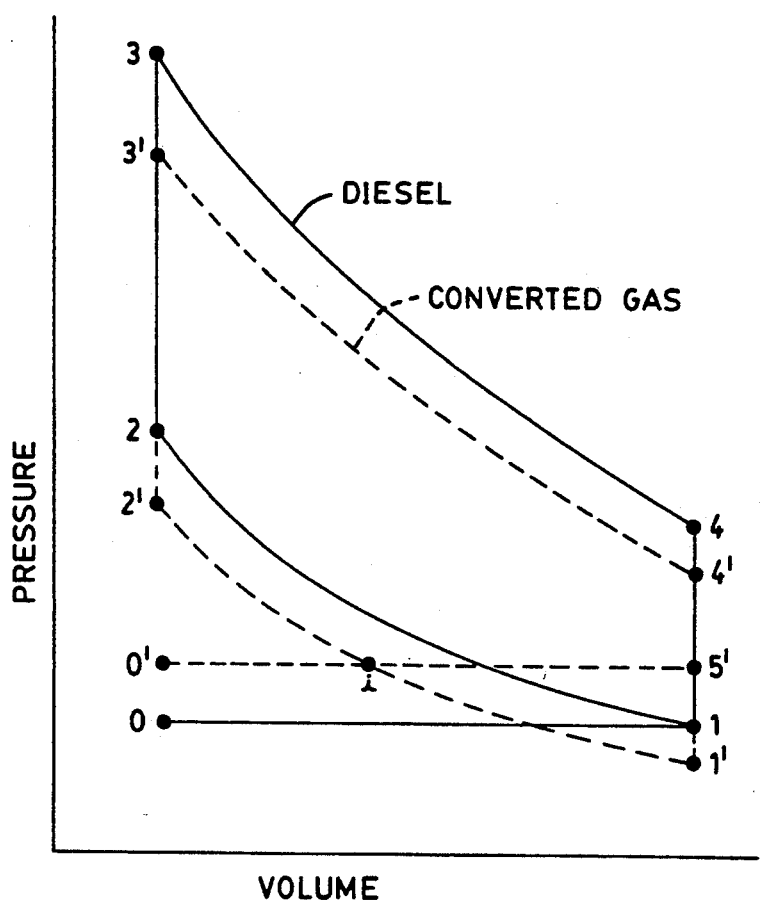
FIG. 1 is a graph representing the pressure-volume characteristics of a conventional diesel engine and the pressure-volume characteristics of the same engine converted to natural gas fuel in accordance with the invention.
Figure 2:
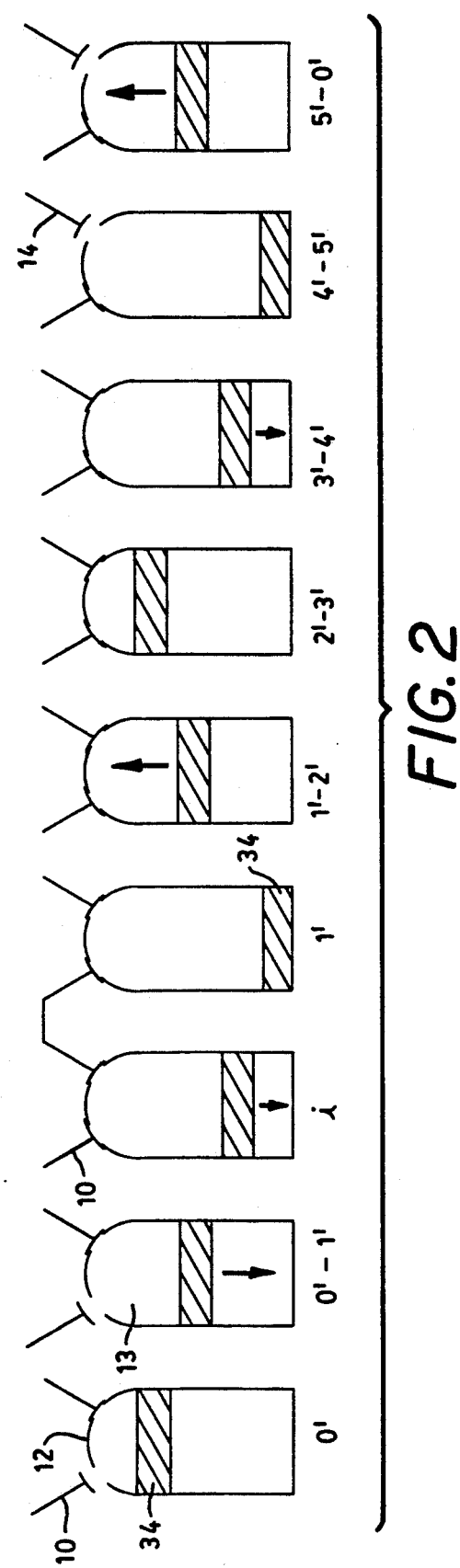
FIG. 2 is a series of stylized diagrammatic representations of an engine cylinder with its piston disposed in various positions corresponding to locations on the graph of FIG. 1.
Figure 3:
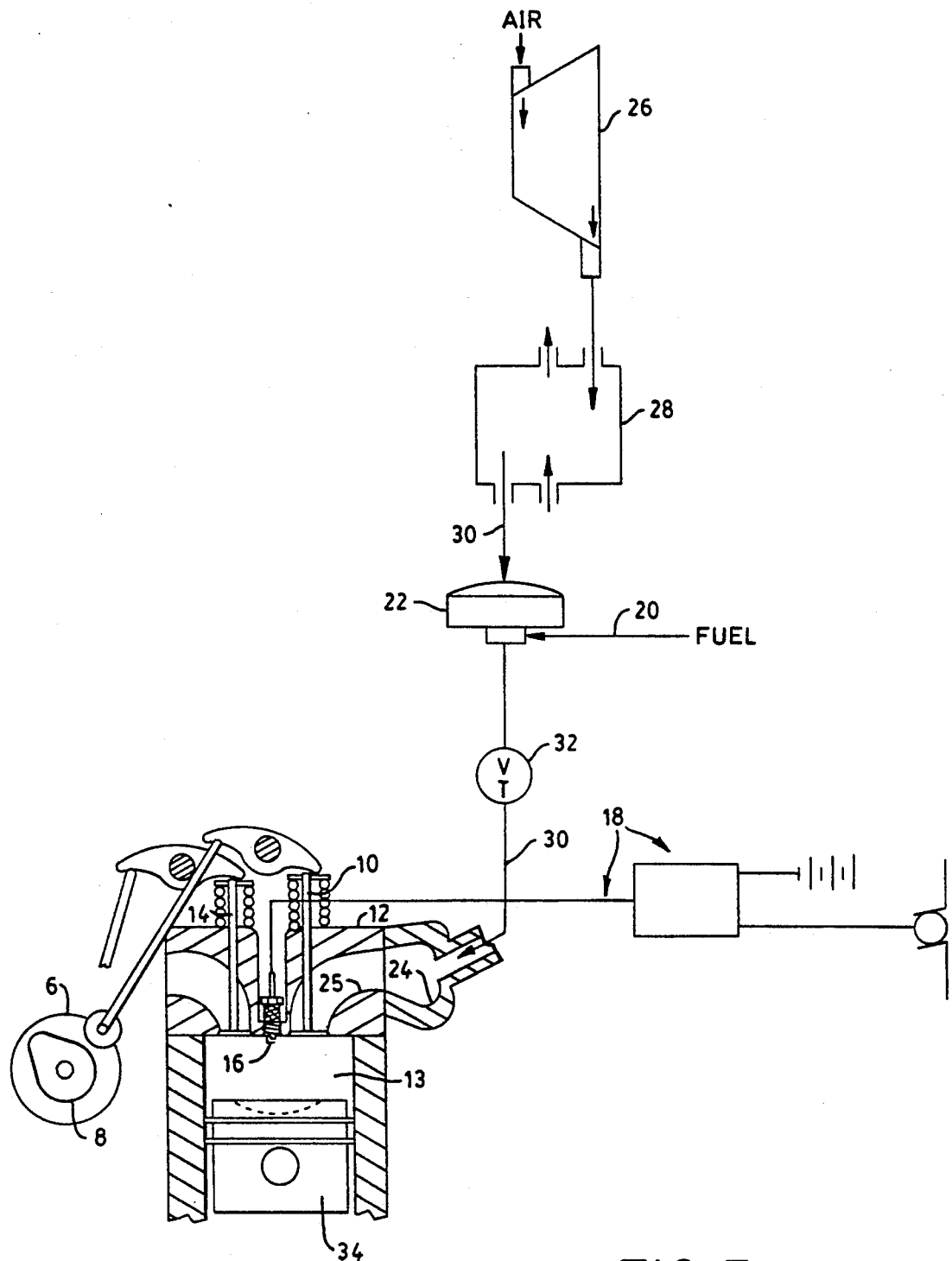
FIG. 3 is a diagrammatic representation of the natural gas fueled engine and associated components after completion of the conversion.

In carrying out the inventive conversion of a four-stroke cycle diesel engine to a natural gas fueled engine, it is necessary that a camshaft portion 6 of the diesel engine be provided with new cam profiles 8 (FIG. 3). The configuration of the cams is modified such that the new cam profiles 8 are operative to close intake valves 10 of cylinder heads 12 of the engine during the intake stroke (FIGS. 1 and 2,i.), are operative to close exhaust valves 14 (FIGS. 1 and 2,0') of the cylinder heads 12, and are operative to open the intake valves 10 upon or after the closure of the associated exhaust valves 14 (FIG. 2.0').

By closing the intake valve 10 of a given cylinder head 12 during an intake stroke, and before completion of the intake stroke, the volume of fuel-air mixture admitted to the cylinder is limited to less than a full charge. During the immediately subsequent compression stroke, the gaseous fuel is compressed (FIG. 1) effectively from i to 2', significantly less than in the case of the diesel fuel compression stroke, shown extending from 1 to 2, in FIG. 1. Typically, the diesel compression ratio is about 16:1 to 22:1. The compression ratio of the gaseous fuel in a cylinder 13 is about 9:1 to 12:1.

The second major function performed by the modified cam profiles 8 is that of insuring that the intake valves 10 open no earlier than closure of the exhaust valves 14, thus preventing gaseous fuel entering the cylinder head through an inlet valve and passing through the cylinder head and out an exhaust valve without having contributed to power output of the engine.

In the conversion process, the cylinder heads must be modified to accept spark plugs. In some diesel engines the modification may involve only removal of the diesel fuel injector. In most instances, more will be required, as for example, boring a spark plug receiving hole in the cylinder head wall, or modifying or enlarging a diesel fuel injector hole. Such modification, in and of itself, is known and often practiced and is not considered a major alteration to the cylinder head.

Once the cylinder head has been modified to accept a spark plug, a spark plug 16 (FIG. 3) is provided and fixed in the seat provided for it. There is then provided an ignition circuit 18 (FIG. 3), known in the art, for energizing the spark plug 16 at the appropriate moment to obtain timely combustion of the fuel-air mixture in the cylinder 13 and precipitate a useful expansion, or power, stroke (FIGS. 1 and 2; 3'-4').

In accordance with the conversion method herein, it is necessary to provide means for conveying natural gas fuel to the intake valves. The fuel preferably is conducted by piping 20 (FIG. 3) to a fuel metering and mixing apparatus 22, such as a carburetor, for natural gas, where the fuel is mixed with air. The fuel-air mixture is then directed from the carburetor 22 to an intake manifold 24 and the individual inlet passages 25 in the cylinder head 12 in which are disposed the intake valves 10.

In accordance with a further feature of the conversion process, there is provided blower means 26 for compressing air to an elevated pressure and directing the air under pressure to the intake valves 10. In a preferred embodiment, the blower means 26 forces air into the carburetor 22 to mix with fuel and, thence, into the intake manifold 24 and through the intake valves 10 into the cylinder 13. In diesel engines having blower means, it usually is the case that the output of the diesel engine blower will have to be up-graded so as to increase the pressure of the air-fuel mixture in the cylinder. As noted above, because the intake valve closes before completion of the intake stroke, the volume of mixture admitted to the cylinder is less than a full charge. However, a blower up-graded to provide a higher compression ratio permits the reduced volume of fuel-air mixture, which is compressed in the cylinders by a ratio of about 9:1, to contain the same air mass as in the engine when operating on diesel fuel.

To avoid self ignition of a portion of the fuel-air mixture during the combustion process, or "knock", as a consequence of temperature rise in compression, there is provided an after-cooler 28 which receives the air discharge of the blower and releases cooled compressed air into ducting 30 leading to the intake manifold 24. Even after compression in the cylinder 13, the fuel-air mixture fails to ignite on its own accord and requires ignition by the spark plug 16 and propagation of the flame.

To control the power of the engine, there is provided a throttle valve 32 disposed in the ducting 30 between the carburetor 22 and the intake manifold 24 and adapted to selectively increase and decrease the flow of fuel-air mixture into the intake manifold.

In operation, air is taken into the blower means 26 (FIG. 3) and compressed to about double its entering pressure. The pressurized air from the blower means 26 is directed through the after-cooler 28 to reduce the temperature of the compressed air. From the after-cooler 28, the air is carried through the ducting 30 to the carburetor 22 wherein the air is mixed with gaseous fuel entering the carburetor from the fuel piping 20. From the carburetor 22, the fuel-air mixture continues through the ducting 30 to the throttle valve 32 and thence into the intake manifold 24.

Referring to FIGS. 1 and 2, when a piston 34 is at the top of its travel within the cylinder 13, in response to the cam profile 8 the intake valve 10 opens, permitting the fuel-air mixture to enter the cylinder (position 0'). The fuel-air mixture enters the cylinder, and the piston 34 travels downwardly, as viewed in FIG. 2, 0'-i, the volume of fuel-air mixture in the cylinder increasing, as shown in FIG. 1, with the pressure of the fuel-air mixture remaining essentially unchanged. When the cylinder reaches the position i, the inlet valve 10 is caused by the new cam profile to close, shutting off the supply of fuel-air mixture to the cylinder. The piston 34, however, continues its downward travel to completion of the intake stroke, at which the piston 34 is at or near bottom of the cylinder, FIGS. 1 and 2, position 1'. The piston 34 then moves upwardly through the compression stroke 1'-2', wherein the fuel-air mixture is reduced in volume and increased in pressure. Inasmuch as the air, compressed in the blower, is cooled in the after-cooler 28, the compression temperature in the fuel-air mixture by the additional 9:1 compression is short of that needed for self-ignition and the fuel-air mixtures does not self-ignite prior to spark ignition or during combustion at location 3'.

The ignition system 18 and the spark plug 16, however, operate to provide a spark in the 2' position, to initiate combustion and start the expansion or power stroke 3'-4'. At the 4' position, the cam profile causes the exhaust valve 14 to open and a portion of the gas in the cylinder flows through the exhaust valve 14 into the exhaust manifold, causing the pressure in the cylinder to drop from 4' to 5'. The piston 34 then travels upwardly (5'-0') to exhaust the combustion gases through the open exhaust valve 14. When the piston 34 reaches the top of the cylinder, the exhaust valve 14 closes and thereupon, or thereafter, the intake valve opens (0'), to start another cycle of operation. The intake valve 10 is caused by the cam profile 8 to remain closed until the exhaust valve 14 closes. Thus, fuel-air mixture is not permitted to pass through a cylinder without firing for the power stroke.

The above method provides a number of advantages including, most importantly, a number a steps rendered unnecessary. For example, in the above-described procedure it is not necessary to undertake modification of the piston, engine block and crank shaft. Of the major engine components, only a minor modification to the cylinder head is required to adapt the cylinder head to receive spark plugs. Changing the cam profiles of the camshaft does not affect engine durability or the dynamic characteristics of the rotating components of the engine. Among performance advantages are a low effective compression ratio and large expansion ratio providing a high thermal efficiency, low exhaust gas temperature, low exhaust emissions, and retention of the diesel power output. The variable spark timing contributed by the ignition system and spark plug optimizes performance and contributes to minimization of emissions. Further, the procedure described above is applicable to diesel engines of all sizes.

It is to be understood that the present invention is by no means limited to the particular construction and method steps herein disclosed and/or shown in the drawings, but also comprises any modifications or equivalents within the scope of the claims.

Having thus described my invention, what I claim as new and desire to secure by Letters Patent of the United States is:

I claim:

1. A method for converting a four-stroke cycle diesel engine to a natural gas fueled engine, the method comprising the steps of providing new cam profiles on a camshaft portion of said diesel engine, said new cam profiles being operative to close intake valves of cylinder heads of said engine before completion of the diesel engine intake stroke, operative to close exhaust valves of said cylinder heads, and operative no earlier than said exhaust valves closures to open associated intake valves, modifying portions of said cylinder heads to adapt said cylinder heads to accept spark plugs, fixing spark plugs in said cylinder heads, providing means for conveying natural gas fuel to said intake valves, providing a blower for supplying air under pressure to said intake valves, and providing an after-cooler for cooling the air supplied by said blower prior to said air reaching said intake valves.

2. The method in accordance with claim 1 wherein said blower is adapted to provide pressure in an intake manifold such as to provide fuel-air flow to said cylinder heads to off-set the otherwise reduced fuel-air flow resulting from said closure of said intake valves before completion of said diesel engine intake stroke.

3. The method in accordance with claim 1 wherein said blower is adapted to compress air passing therethrough at a ratio of about 1.5:1 to 3.5:1.

4. The method in accordance with claim 1 and including the further step of providing a fuel-air metering and mixing apparatus adapted to receive air from said after-cooler and gaseous fuel from a fuel source and discharge therefrom a fuel-air mixture.

5. The method in accordance with claim 4 and including the further step of providing a throttle valve in ducting from said fuel-air metering and mixing apparatus to said intake valves, said throttle being selectively operable to vary the flow of said fuel-air mixture to said intake valve.

6. The method in accordance with claim 1 and including the additional step of providing an ignition circuit in communication with said spark plugs.

7. The method in accordance with claim 3 wherein said closure of said intake valves before completion of said intake stroke operates to introduce into said cylinders during said intake stroke a less than full charge of fuel-air mixture, and a subsequent compression stroke is adapted to generate an effective compression ratio of said fuel-air mixture in said cylinders of about $\frac{2}{3}$ to $\frac{1}{3}$ the compression ratio of the diesel engine.

8. The method in accordance with claim 7 wherein said effective compression ratio of the converted engine is about 9:1.

9. A method for converting a four-stroke cycle diesel engine to a natural gas fueled engine, the method comprising the steps of providing cam means for opening and closing intake valves and exhaust valves of cylinder heads of said diesel engine, said cam means being adapted to cause said intake valves to close before completion of an intake stroke, to cause less than a full charge of fuel-air mixture to be admitted to said cylinder head during said intake stroke, providing blower means for supplying air to said intake valves at a pressure of about 1.5 to 3.5 times atmospheric pressure, said cylinder head being adapted to have a compression ratio relative to fuel-air mixture of about $\frac{1}{3}$ to $\frac{2}{3}$ the compression ratio relative to a full charge of air in the diesel engine, providing an after-cooler for cooling air supplied by said blower means, modifying portions of said cylinder heads to adapt said cylinder heads to accept spark plugs, fixing spark plugs in said cylinder heads, and providing an ignition circuit in communication with said spark plugs.

10. The method in accordance with claim 9 including providing said cam means further adapted to close said exhaust valves before opening associated intake valves.

* * * * *